(12) United States Patent
Jaulin et al.

(10) Patent No.: US 11,115,134 B2
(45) Date of Patent: Sep. 7, 2021

(54) TEST METHOD IMPLEMENTED BY AN APPARATUS COMPRISING AT LEAST TWO RADIO COMMUNICATION DEVICES

(71) Applicant: SAGEMCOM BROADBAND SAS, Rueil Malmaison (FR)

(72) Inventors: Jean-Philippe Jaulin, Rueil Malmaison (FR); Nicolas Dangy-Caye, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 0 days.

(21) Appl. No.: 15/537,137

(22) PCT Filed: Dec. 15, 2015

(86) PCT No.: PCT/EP2015/079745
§ 371 (c)(1),
(2) Date: Jun. 16, 2017

(87) PCT Pub. No.: WO2016/096823
PCT Pub. Date: Jun. 23, 2016

(65) Prior Publication Data
US 2018/0269993 A1 Sep. 20, 2018

(30) Foreign Application Priority Data
Dec. 17, 2014 (FR) ..................... 14/62597

(51) Int. Cl.
*H04B 17/00* (2015.01)
*H04B 17/15* (2015.01)
(Continued)

(52) U.S. Cl.
CPC ......... *H04B 17/0085* (2013.01); *H04B 1/406* (2013.01); *H04B 17/15* (2015.01);
(Continued)

(58) Field of Classification Search
CPC ......... G01S 5/0221; G01S 19/23; H04B 1/30; H04B 7/0669; H04B 17/0082;
(Continued)

(56) References Cited

U.S. PATENT DOCUMENTS 6,970,680 B1 * 11/2005 Tomoe ................. H04B 1/1027
455/452.1
7,420,384 B1 * 9/2008 Sabih .................... G06F 11/263
324/750.3
(Continued)

FOREIGN PATENT DOCUMENTS

CN 101 696 652 2/2011
EP 2 434 669 3/2012

OTHER PUBLICATIONS

International Search Report and Written Opinion of the ISA for PCT/EP2015/079745, dated Mar. 3, 2016, 12 pages.

*Primary Examiner* — Yuwen Pan
*Assistant Examiner* — Paul P Tran
(74) *Attorney, Agent, or Firm* — Nixon & Vanderhye, P.C.

(57) ABSTRACT

The present invention relates to a test method implemented by an item of equipment (10) comprising at least two radio-communication devices (12, 13) for testing at least one transmitter and receiver of said radio-communication devices. According to the invention, it comprises the following steps implemented for testing a transmitter (120) to be tested of a transmitting radio-communication device (12) and/or a receiver (131) to be tested of a receiving radio-communication device (13) of the same item of equipment (10), a step (E100) of transmitting a test signal in a transmission channel of said transmitter (120) of said transmitting radio-communication device (12), and
(Continued)

a step (E200) of detection, in a reception channel corresponding to said transmission channel of said transmitter (120), of the test signal transmitted.

14 Claims, 5 Drawing Sheets (51) Int. Cl.
*H04B 17/29* (2015.01)
*H04B 17/19* (2015.01)
*H04B 1/403* (2015.01)
*H04W 24/06* (2009.01)
*H04W 72/02* (2009.01)

(52) U.S. Cl.
CPC ............. *H04B 17/19* (2015.01); *H04B 17/29* (2015.01); *H04W 24/06* (2013.01); *H04W 72/02* (2013.01)

(58) Field of Classification Search
CPC .... H04B 17/0085; H04B 17/15; H04B 17/19; H04B 17/20; H04B 17/21; H04B 17/29; H04B 17/309; H04B 17/318; H04B 17/327; H04B 17/336; H04B 1/715; H04B 1/406; H04B 17/24; H04B 17/30; H04B 17/364; H04L 1/0625; H04L 1/0631; H04L 1/24; H04L 41/22; H04L 43/50; H04L 12/66; H04M 1/24; H04W 24/00; H04W 24/06; H04W 52/48; H04W 72/02; H04W 4/80; H04W 48/08; H04W 72/0446; H04W 72/082; H04W 72/1215; H04W 84/12; H04W 88/06

See application file for complete search history.

(56) References Cited

U.S. PATENT DOCUMENTS

| | | | | |
|---|---|---|---|---|
| 9,065,537 | B2* | 6/2015 | Georgantas | H04B 1/30 |
| 2006/0082494 | A1* | 4/2006 | Deininger | H04B 17/20 |
| | | | | 342/165 |
| 2006/0197538 | A1* | 9/2006 | Leinonen | H04B 17/19 |
| | | | | 324/533 |
| 2006/0268968 | A1* | 11/2006 | Chen | H04B 17/327 |
| | | | | 375/224 |
| 2008/0274726 | A1* | 11/2008 | Simola | H04W 24/00 |
| | | | | 455/423 |
| 2009/0168800 | A1* | 7/2009 | Leinonen | H04B 1/3805 |
| | | | | 370/464 |
| 2010/0093282 | A1* | 4/2010 | Martikkala | H04B 17/364 |
| | | | | 455/63.4 |
| 2012/0134390 | A1* | 5/2012 | Smadi | H04B 1/715 |
| | | | | 375/133 |
| 2012/0184296 | A1* | 7/2012 | Milosiu | G01S 11/06 |
| | | | | 455/456.1 |
| 2013/0266052 | A1 | 10/2013 | Yang et al. | |
| 2014/0029535 | A1* | 1/2014 | Medapalli | H04W 72/0446 |
| | | | | 370/329 |

* cited by examiner

TEST METHOD IMPLEMENTED BY AN APPARATUS COMPRISING AT LEAST TWO RADIO COMMUNICATION DEVICES

This application is the U.S. national phase of International Application No. PCT/EP2015/079745 filed 15 Dec. 2015, which designated the U.S. and claims priority to FR Patent Application No. 14/62597 filed 17 Dec. 2014, the entire contents of each of which are hereby incorporated by reference.

The present invention relates to a test method used by equipment for testing at least one transmitter and/or receiver of radio-communication devices that said equipment has.

Testing a radio-communication device of equipment that incorporates it, such as a gateway, makes it possible to determine the functional validity thereof and can be done either at the end of the production of this equipment or during use thereof by a user, in order in particular to diagnose any fault. Generally, it requires the use of means external to the equipment to be tested in order to be carried out, which a user does not generally have.

Particularly in the case of many radio-communication devices that may be integrated in an item of equipment (2.4 GHz Wi-Fi, Bluetooth, Zigbee, 5 GHz Wi-Fi, DECT, etc.), such a test is always tricky. This is because the connection between one of these radio-communication devices of the equipment in question and a remote apparatus, generally a test apparatus, uses a plurality of interfaces:

In the equipment itself, an interface between the main processor managing the communication for the equipment in question and the radio-frequency transceiver component that is responsible for the communication as well as a physical interface between this RF component and at least one antenna (the RF component and antennas form together the radio-communication device to be tested). This physical interface may consist of a large number of passive components (filters, matching components, etc.), as well as active components (amplifiers).

An interface consisting of the air medium serving as a carrier for the propagation of radio waves between the equipment itself and the distant apparatus.

In the distant apparatus, a physical interface between its antenna or antennas and a radio-frequency component responsible for the communication and an interface between this RF component and the principal processor managing the communication for the distant apparatus.

In addition, the establishment of a communication between the equipment to be tested and a distant appliance requires the use of communication protocols particular to each of the technologies used by the radio-communication devices involved. According to the technology used, it may be necessary to use keys (WEP, WPA, etc. in the case of the Wi-Fi standard, PIN code in the case of the Bluetooth standard, etc.), protections of the access-rights type or list of MAC addresses authorised, or others.

The principal processor of an item of equipment, because it establishes a logic dialogue with the RF transceiver component of the same equipment, is in a position to know the state of the interface between them. Diagnosis of the radio-communication device overall (RF component+antennas) therefore amounts to diagnosing the functioning of the RF component, as well as its interface with the antenna or antennas of the equipment.

Several known methods are at present used for carrying out a diagnosis of a radio-communication device.

According to a particular method, the test is carried out separate from the transmission chain and reception chain by means of one or more external test appliances. This type of test is widely used during manufacturing or debugging phases, and requires the use of specialised equipment.

To check the functioning of the transmission chain, the equipment to be tested is placed in a so-called "transmission test" mode in which a transmitter of its radio-communication device transmits a particular known test signal. A distant measuring appliance of the analyser type then receives the test signal transmitted normally by the equipment, analyses it and gives the characteristics thereof. The difference between the result obtained and the expected result can inform the technician about the behaviour of the transmission chain.

In the same way, in order to check the functioning of the reception chain, a distant measuring appliance of the generator type transmits to the radio-communication device of the equipment a particular known test signal. The equipment is placed in a so-called "reception test" mode in which a receiver of its radio-communication device returns a signal reflecting the signal that it receives. The difference between the result obtained and the expected result can inform the technician about the behaviour of the reception chain.

This type of test make it possible to characterise the transmission chains independently while taking no account of the communication protocol used. It is entirely suited to debugging, but, because of the need to use complex equipment, it cannot be used for diagnosis purposes on site at a non-technician user.

According to another method, the test is carried out through an attempt at actual connection between two items of equipment comprising the same radio-communication interfaces. The establishment of a wireless connection between these two items of equipment requires a prior mutual-registration phase. This phase uses the uplinks (from equipment used as peripheral to equipment used as base station) and downlinks (from equipment used as base station to equipment used as peripheral). A simple analysis makes it possible to obtain information on the radio-communication devices of the two items of equipment.

The equipment having the role of base station sends particular information (beacon in the caser of a Wi-Fi device, dummy-bearer in the case of a DECT device, etc.). The equipment with the role of peripheral wishing to be registered on the equipment used as a base station presents to its user a list of potentially joinable base stations. If the equipment fulfilling the role of base station appears on this list, the user can consider that the transmitter of the radio-communication device of the equipment fulfilling the role of base station and the receiver of the radio-communication device of the equipment fulfilling the role of peripheral are both functional. On the other hand, absence from this list does not prove malfunctioning and, if there is malfunctioning despite everything, this absence does not make it possible to identify the cause thereof (hardware, keys, transmitter of the base-station equipment, receiver of the peripheral equipment, etc.).

When the user selects the base-station equipment and initiates the registration procedure, a bidirectional exchange is implemented between this base-station equipment and the peripheral equipment (request for registration, exchange of keys, agreement, etc., which are dependent on the technology and protocol used). If the registration succeeds, the user can consider that all the radio-communication devices are functional. Otherwise, the information returned by the equipment is not sufficient to identify the cause of the malfunctioning (hardware, keys, access rights, etc.).

This type of test normally used, even involuntarily, by all users of communicating products who are not experts is very empirical, quickly shows its limits and requires the use of hardware other than the equipment to be diagnosed. It cannot therefore be used to establish a reliable diagnosis.

Another method is a method for diagnosing the transmission chain by means of a radio-field detector. This basic method, widely known to persons skilled in the art, consists of measuring the field emitted by a transmission chain by means of a radio-field detector connected to a measuring antenna. This type of measurement gives good information on the signal level actually transmitted by the antenna and therefore on the correct state of the whole of the transmission chain. Nevertheless, this method does not make it possible to characterise the performance of the reception chain.

Another method is a diagnosis of the reception chain by means of a test-signal generator. Such a method is in particular described in the U.S. Pat. No. 8,280,442 and consists of evaluating the effects of a particular signal injected into the reception chain and thus characterising its performance. This method also does not make it possible to characterise the performance of the transmission chain.

In addition, the latter methods require the use of components the only function of which is to provide this diagnosis, which therefore gives rise to an additional cost in the equipment.

The aim of the present invention is to propose a method for diagnosing a radio-communication device of equipment that does not solve the problems posed by the diagnosis methods of the prior art that have just been briefly described.

To this end, the present invention relates to a test method used by equipment comprising at least two radio-communication devices for testing at least one transmitter and receiver of said radio-communication devices. This method is characterised in that it comprises the following steps implemented for testing a transmitter to be tested of a transmitting radio-communication device and/or a receiver to be tested of a receiving radio-communication device of the same equipment, a step of transmitting a test signal in a transmission channel of said transmitter of said transmitting radio-communication device, and a step of detecting, in a reception channel corresponding to said transmission channel of said transmitter, the test signal transmitted.

According to a particular embodiment, said detection step consists of noting the triggering by said receiver of said receiving radio-communication device of an event caused by the presence of said test signal in a channel used by said receiving radio-communication device.

According to an alternative particular embodiment, said detection step comprises:

a step of measuring the radio-field level for an interval of time and in a reception channel of said receiving communication device corresponding to the interval of time and to the channel transmitting the test signal transmitted by the transmitter of said transmitting communication device, and a step of comparing this measured level with a predetermined target level.

According to a particular embodiment, said method also comprises:

a step of selecting at least one transmission channel for said transmitting radio-communication device, a step of configuring said transmitting and receiving radio-communication devices so that they can respectively transmit said test signal in the transmission channel or channels selected and detect said test signal in one or more reception channels of said receiving radio-communication device corresponding to the transmission channel or channels selected.

Said selection step may for example consist of arbitrarily choosing said transmission channel or channels.

It may also consist of choosing, from all the transmission channels supported by the transmitting radio-communication device, the transmission channel or channels that are the most calm.

According to a particular embodiment, the test signal is signed in the form of a predetermined time and/or frequency sequence of bits and/or transmitted power levels that the receiver of said receiving radio-communication device can distinguish from the transmission schemes that the surrounding transmitters are liable to use.

According to a particular embodiment, said detection step is performed for each bit of said sequence of said test signal, said method comprising a step of verifying the validity of each bit and a step of verifying the validity of all the bits of the test signal.

According to a particular embodiment, a test method according to the invention also comprises a step of verifying the presence of a measurable radio field at the input of said receiver of the receiving radio-communication device.

The present invention also relates to a computer program loaded into a memory of a processing unit of an item of equipment comprising instructions for the implementation, by a processor of said processing unit, of a test method as just described.

The present invention also relates to storage means provided for storing a computer program comprising instructions for implementing, when it is loaded into a memory of a processing unit of an item of equipment and is executed by a processor of said processing unit, a method as just described.

The features of the invention mentioned above, as well as others, will emerge more clearly from a reading of the following description of example embodiments, said description being given in relation to the accompanying drawings, among which.

The present invention takes advantage of the fact that equipment such as gateways include at least two radio-communication devices that use the same frequency band, for example the so-called ISM (industrial, scientific and medical) band lying between 2.4 and 2.483 GHz, even if they are of different natures. These radio-communication devices may be of the Wi-Fi, Bluetooth, ZigBee or other type.

The transmission and reception chains of these various radio-communication devices being designed to function on a similar frequency band, the conditions of propagation of the signal from the output of the transmitter of a radio-communication device of an item of equipment to the input of the receiver of another radio-communication device of the same item of equipment are optimum and repeatable. Starting from this principle, the simple reception by the radio-communication device receiving a test signal transmitted by the transmitting radio-communication device suffices to consider that the transmission chain of the transmitting radio-communication device and the reception chain of the second radio-communication device are sufficiently functional to provide the connection.

Nevertheless, the modulation principles used by these various radio-communication devices are very often of different natures (frequency and/or time occupation, modulation scheme, channel coding, access to the medium, etc.), so that two different radio-communication devices of the same item of equipment have very little chance of being able to dialogue with each other. This is because a signal transmitted by a transmitting radio-communication device is perceived as noise in the reception channel of a radio-communication device.

The present invention relates to a method for diagnosing a radio-communication device of equipment benefiting from the simultaneous presence within the same equipment of a plurality of radio-communication devices sharing the same frequency band, even if they do not use the same communication protocol, which makes it possible, without any increase in cost, to remedy the defects mentioned previously in the preamble of the present description concerning the diagnostic methods of the prior art.

Figure 1:
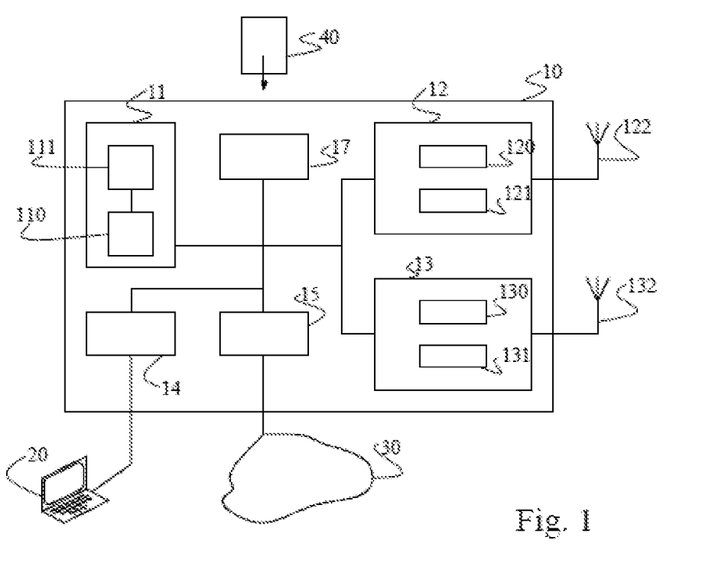
FIG. 1 is equipment that is able to implement a test method according to the present invention.

An item of equipment that is able to implement a diagnostic method according to the present invention is shown in FIG. 1 in the form of a gateway 10 that comprises a controller 11 designed to control a radio-communication device 12 according to a first standard and a radio-communication device 13 according to a second standard, for example different from the first standard. The controller 11 also controls, as a gateway controller, a network interface 14, for example of the Ethernet type, in order for example to be able to communicate with a computer 20 and an internet global interface 15, for example of the xDSL type, for communicating on the internet 30.

The radio-communication device 12 comprises a transmitter 120 and a receiver 121 and is connected to an antenna 122 for the transmission and reception of electromagnetic waves in the respective transmission and reception channels.

Likewise, the radio-communication device 13 comprises a transmitter 130 and a receiver 131 and is connected to an antenna 132 for transmitting and receiving electromagnetic waves in respective transmission and reception channels.

The test method according to the present invention is described for an item of equipment such as the one that has just been described in relation to FIG. 1 considering, by way of example, that the first standard is in accordance with the so-called Wi-Fi standard whereas the second standard is the so-called Bluetooth standard.

It should be stated here that the Wi-Fi standard relates to a set of communication protocols given by the ISO/EIC 8802/11 (IEEE 802.11) standards. More specifically, the IEEE 802.11b and g standards operate in the 2.4 GHz frequency band. Likewise, the so-called Bluetooth standard relates to IEEE 802.15. It operates in a frequency band lying between 2.4 GHz and 2.4835 GHz.

The diagnostic method according to the invention is used to test a transmitter of a radio-communication device, hereinafter referred to as the transmitting radio-communication device, for example the transmitter 120 of the radio-communication device 12, by means of another radio-communication device, hereinafter referred to as the receiving radio-communication device, for example the radio-communication device 13, of the same item of equipment 10.

This method comprises a first step E100 of transmitting a test signal in a transmission channel of said transmitter 120 of the transmitting radio-communication device 12 (see FIG. 2) and a second step E200 of detecting the test signal in a channel used by said receiving radio-communication device 13 corresponding to the transmission channel used by said transmitting radio-communication device 12 for transmitting said test signal.

Figure 2:
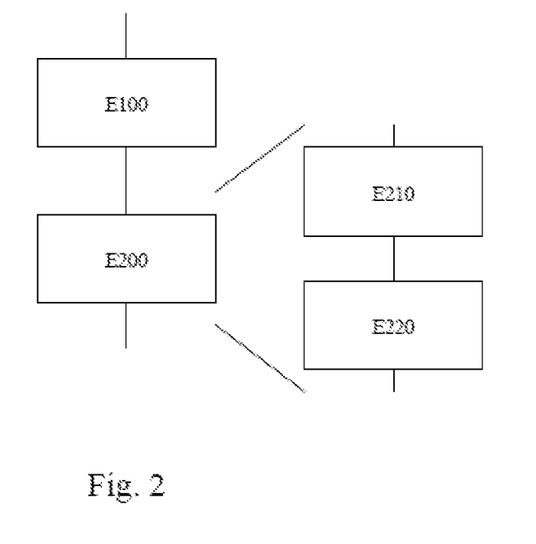
FIG. 2 is a diagram that illustrates the steps that are implemented by a test method according to the present invention.

The transmitting radio-communication device 12 is that of the equipment 10 the transmitter 120 of which it is wished to test, the receiving radio-communication device 13 then being a radio-communication device different from the transmitting radio-communication device 12. Or the receiving radio-communication device 13 is that of the equipment 10 the receiver 131 of which it is wished to test, the transmitting radio-communication device 12 then being a radio-communication device different from the receiving device 13. Or the transmitting radio-communication device 12 and the receiving radio-communication device 13 are those of the equipment 10 where it is wished to carry out the respective tests on their transmitter 120 and receiver 131.

In a first embodiment, the detection step E200 consists of noting the triggering, by the receiving radio-communication device 13 of said equipment 10, of an event caused by the presence of said test signal transmitted by the transmitter 120 of the transmitting radio-communication device 12.

For example, when the transmitting radio-communication device 12 that transmitted said test signal operates according to the Bluetooth standard and the receiving radio-communication device 13 operates according to the Wi-Fi standard, the detection step E200 may consist of noting an error feedback of the "stuck beacon" type of the receiver 131 of the radio-communication device 13 while the transmitter 120 of the radio-communication device 12 transmits the test signal over a transmission channel and the radio-communication device 13 also seeks to access a transmission channel corresponding to the transmission channel used by the transmitter 120 of the radio-communication device 12. This is because the radio-communication device 13 using a means of access to the carrier of the CSMA-CA (Carrier Sense Multiple Access with Collision Avoidance) type cannot send a beacon signal because of the detection of the test signal by its receiver 131 and returns an error message of the "stuck beacon" type. The detection step E200 consists of noting the triggering of the sending of this message.

Likewise, the detection step E200 may consist of noting the change in the working channel used by the receiving radio-communication device 13 following the transmission, in a frequency band corresponding to the working channel of the moment, of the test signal by the transmitter 120 of the radio-communication device 12. This is because a radio-communication device of the Wi-Fi type uses a so-called "ACS" (Automatic Channel Selection) functionality by means of which it continuously carries out a mapping of its radio environment and automatically selects the least disturbed channel. Injecting the test signal into a frequency band corresponding to the working channel of the moment disturbs this channel so that the Wi-Fi radio-communication device 13 changes working channel. The detection step E200 therefore consists of noting this change in channel.

Still likewise, the detection step E200 may consist of using the so-called "noise floor" functionality for making a measurement of the noise level in the frequency band corresponding to the channel transmitting the test signal and in order to deduce therefrom the presence of the test signal in this frequency band.

When the transmitting radio-communication device 12 operates according to the Wi-Fi standard and the receiving radio-communication device 13 operates according to the Bluetooth standard, the latter using the so-called "AFH" (Adaptive Frequency Hopping) functionality, the detection step E200 may consist of noting the introduction of a new "bad" channel while the test signal is transmitted by the transmitting radio-communication device 12.

In another embodiment, the detection step E200 comprises a step E210 of measuring the radio-field level of the signal present during an interval of time and in a reception channel of said receiving communication device 13 corresponding to the interval of time and transmission channel of said test signal transmitted by the transmitter 12 of said transmitting communication device 12 and a step E220 of comparing this measured level with a target level.

The measurement step E210 in question may consist of reading, as the radio-field level, the so-called RSSI (Received Signal Strength Indicator) generally used in radio-frequency receivers for knowing the reception power of a signal and assessing the occupation of a channel.

The target level is a predetermined level that has previously been established

For example, it is established theoretically, at the time of the design of the equipment in question, taking account of its architecture and characteristics of propagation of a signal transmitted from a transmitter 120; 130 of a communication device 12, 13 to a receiver 131; 121 of another communication device 13 of the same item of equipment 10.

The theoretical establishment of the target level must take account of the characteristics of the test signal transmitted in terms of spectral occupation, type of modulation etc. It must also take account of the characteristics of the receiver in question in terms of bandwidth and radio-field reception performance. This in order to allow a measurement taking account of the inherent characteristics of the transmitter 120 and receiver 131 in question.

The target level may also be established, at the time of the design or manufacture of the equipment, by a measurement of the radio-field level received by a receiver 131 of a communication device 13 in the presumed band of a transmitter 120 of another communication device 12 when the latter transmits a predetermined signal. This measurement makes it possible to evaluate the actual propagation conditions through the whole of the communication chain in question.

The step E220 of comparing the value of the target level obtained at the time of the design or manufacture of the product and the value of the level measured at step E210 makes it possible to obtain a diagnosis of the state of all the components of the chain in question. The criterion for acceptance of this comparison may for example be the target level corresponding to a predetermined value to be obtained, along with a predetermined tolerance window, and corresponding for example to the probable distribution of the characteristics of the various elements used during the mass production of equipment.

The step E210 of measuring the radio-field level of the test signal transmitted may be disturbed if a plurality of close-by transmitters, for example transmitters of radio-communication devices of adjacent equipment other than the equipment in question, using the same frequency band, and particularly the same transmission channel, are present. In this case, the radio-field level measured by the second radio-communication device 13 is the sum of the signals transmitted by these close-by transmitters and the test signal that is then embedded therein.

To solve this problem, according to the present invention, the transmitter 120 of the transmitting radio-communication device 12 transmits a test signal that is signed according to a deterministic scheme, that is to say known to any transmitter and receiver of the predetermined equipment in question.

Thus the test signal is for example signed in the form of a sequence of predetermined time bits (transmission at predetermined relative instants), and/or predetermined frequency bits (transmission on determined channels), and/or predetermined transmission power levels, combined or not, which the receiver 131 of the receiving radio-communication device 13 can distinguish from the transmission schemes that the surrounding transmitters are liable to use.

For example, the test signal transmitted by the transmitter 12 of a transmitting radio-communication device 12 consists of an 8-bit binary code taking a predetermined value, for example 10010110. In the case of the transmission of the test signal by a transmitter 120 of a Wi-Fi radio-communication device, the value 1 of this code may correspond to the transmission of an OFDM multicarrier Wi-Fi signal with a random payload 20 MHz wide centred on channel 3 (2422 MHz) for a period of 10 ms at a transmission power of 0 dBm at the output point of the transmitter of the Wi-Fi interface and the value 0 of this code corresponds to an absence of transmission (transmission level below −50 dBm) also of a duration of 10 ms.

Let us consider that the propagation characteristic between the Wi-Fi transmitter 120 and the Bluetooth receiver 131 is such that the total attenuation, taking account of the components and of the frequency bandwidth of the receiver 131, is 33 dB±5 dB.

In the case of a communication chain in good condition, the receiver 131 of the receiving radio-communication device 13, of the Bluetooth type, positioned by the controller 11 in continuous reception mode on one of its channels lying between 2413 MHz (channel 11) and 2431 MHz (channel 29), for example on its channel 20, records an RSSI value of below −83 dBm for the reception of a 0 bit of the test signal and 33 dBm±5 dB for the reception of a 1 bit.

Figure 3:
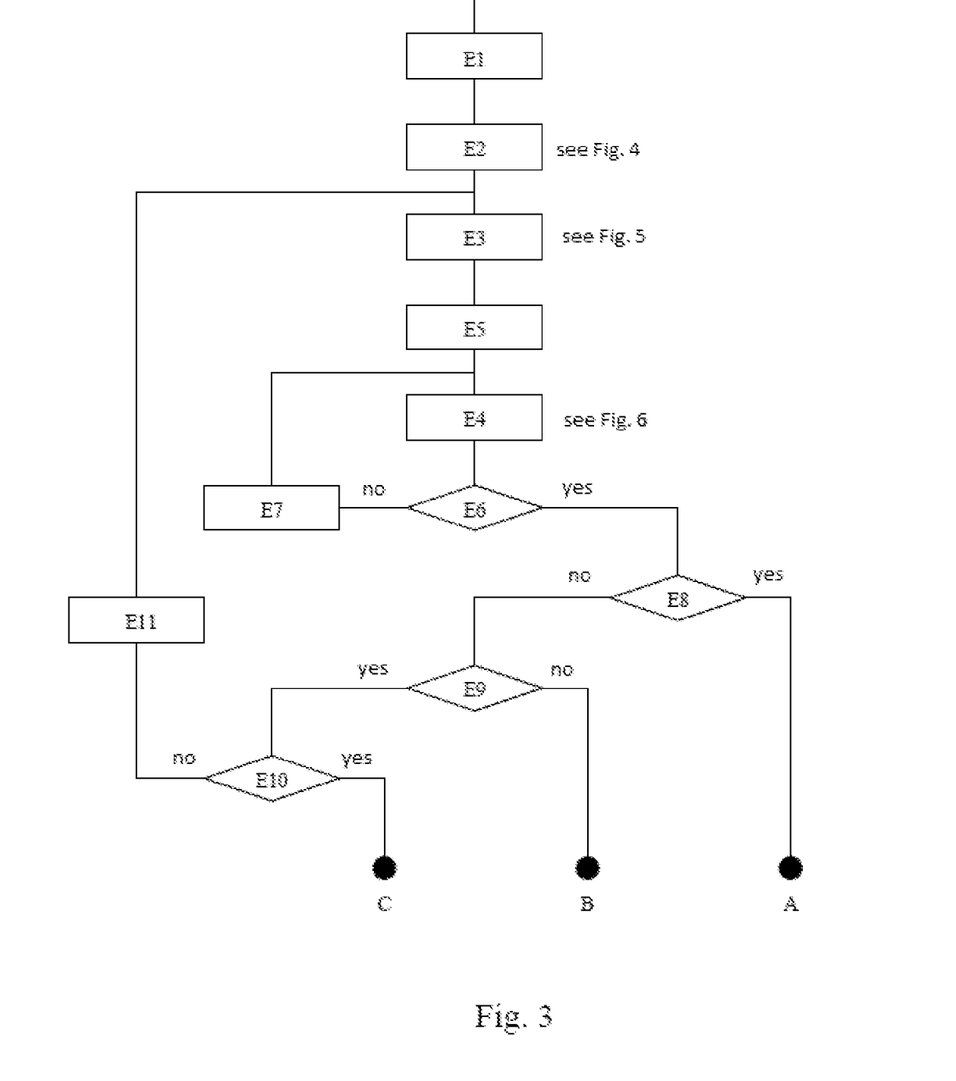
FIG. 3 is a diagram illustrating a particular embodiment of a test method according to the present invention.

A particular implementation of the test method of the present invention is now described in relation to FIG. 3 and taking, solely by way of example, the case of the transmission by a transmitter 120 of a Wi-Fi communication device 12 and reception by a receiver 131 of a Bluetooth communication device 13.

Step E1 is a step of stopping the normal activity of the transmitting and receiving radio-communication devices 12 and 13 affected by the test that it is wished to perform.

Step E2 is a step of selecting one or two transmission channels for the transmitter 120 of the transmitting radio-communication device 12.

Only one transmission channel is selected when the bits at 1 and 0 of the binary code constituting the test signal are transmitted over the same transmission channel. On the other hand two transmission channels are selected when the bits at 1 are transmitted over one transmission channel and the bits at 0 on a second transmission channel.

This selection E2 may consist of arbitrarily choosing this or these transmission channels, for example, for a radio-communication device 12 of the Wi-Fi type, the channel 1 centred on the band at 2412 MHz and optionally the channel 11 centred on the band at 2462 MHz.

According to a variant embodiment, the selection step E2 may consist of choosing, from all the transmission channels of the transmitter 120 of the transmitting radio-communication device 12, the transmission channel or the two transmission channels that is or are the most calm in order to avoid erroneous interpretations caused by emissions from extraneous equipment.

Figure 4:
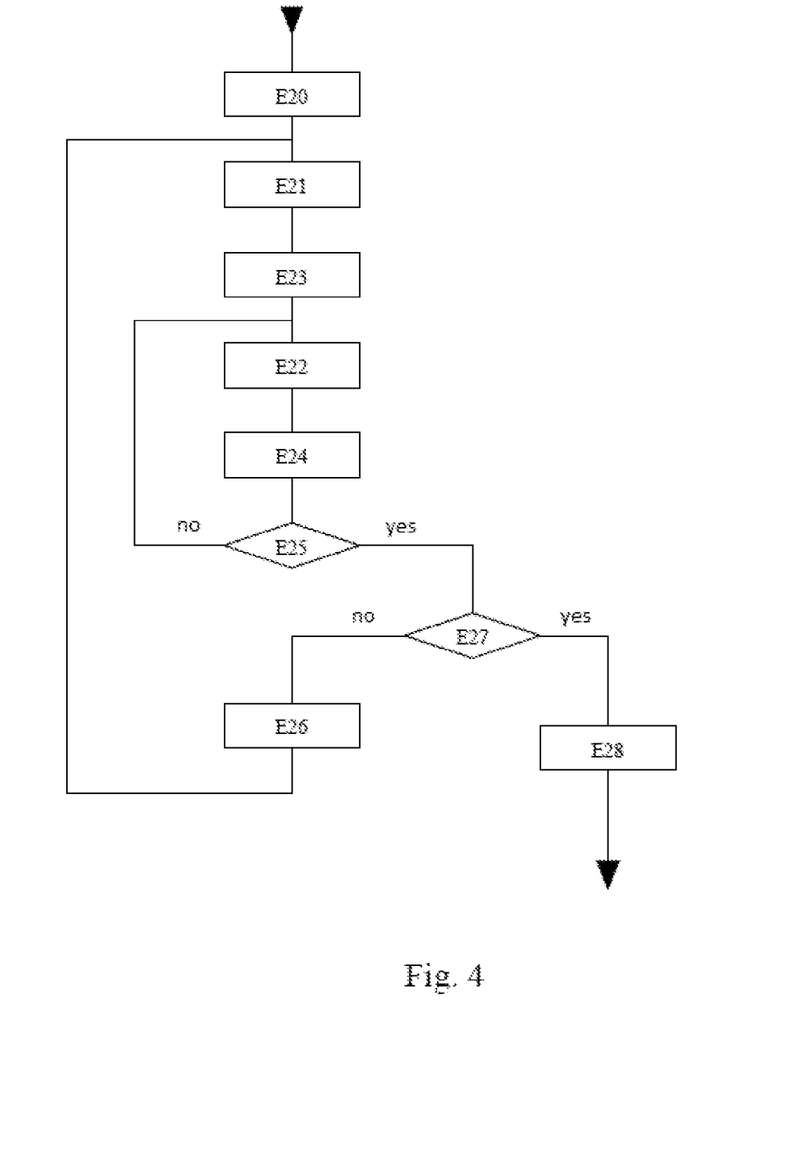
FIG. 4 is a diagram illustrating the steps that are implemented by a step of selecting one or two transmission channels for transmitting a test signal in accordance with the test method according to the present invention.

FIG. 4 illustrates the steps that are then implemented by step E2.

A step E20 is a step of arbitrary selection of a transmission channel of the transmitter 120 of the transmitting radio-communication device 12. For example, for a Wi-Fi transmitting radio-communication device 12, the step E20 may consist of arbitrarily selecting the channel 1 centred on the 2412 MHz band.

A step E21 is a step of positioning the receiving radio-communication device 13 on a channel, the centre frequency of which corresponds to the centre frequency of the transmission channel of the transmitting radio-communication device 12. For example, if the transmission channel is the Wi-Fi channel 1 centred on the 2412 MHz frequency, the Bluetooth radio-communication device 13 is positioned on channel number 10 (2402 MHz+10×1 MHz).

A step E22 is a step of measuring the radio-field level on the input of the receiver 131 of the receiving radio-communication device 13, for example an RSSI measurement step.

It should be noted that, during this measurement, the transmitter 120 of the communication device 12 does not transmit any signal.

This step E22 may be repeated several times by means of a loop on the number N of measurements including a step of initialisation E23 of a counter, a step of incrementation E24 of said counter after each measurement of step E22 and a step E25 of verifying that the count of the counter does not exceed the initialisation value. At each measurement, step E22 keeps the maximum value of the received radio-field level thus measured. This value gives an indication on the occupation of the channel that was selected at step E20.

Steps E21 and E22 are repeated for each of the transmission channels of the transmitter 120 of the transmitting radio-communication device 12, by means of the loop including a step E26 of selecting a new transmission channel and a step E27 of checking that all the transmission channels have been selected.

A step E28 is a step of establishing a list of the transmission channels classified according to the radio-field level measured at step E22, without transmission of the transmitter 120 of the radio-communication device 12, on the input of the receiver 131 of the radio-communication device 13, and of selection of the transmission channel or of the two transmission channels (according to circumstances) having the lowest radio-field level.

Figure 5:
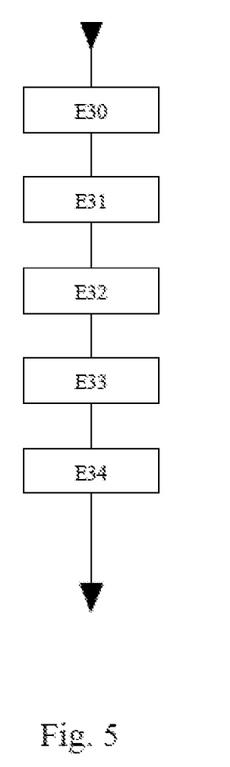
FIG. 5 is a diagram illustrating the steps that are implemented by a step of configuring the transmitting and receiving radio-communication devices for implementing a test method according to the present invention.

A step E3 is a step of configuration of the transmitting 12 and receiving 13 radio-communication devices so that the transmitter 120 of the first can transmit the test signal and so that the receiver 131 of the second can detect this test signal in a reception channel corresponding to the transmission channel of the transmitter 120. FIG. 5 illustrates the steps that are then implemented by step E3. A step E30 is a step of defining the transmission characteristics of a bit at 1, in particular the transmission channel used conforming to a transmission channel selected at step E2 (or E11), the transmission power (for example 0 dBm), the modulation type (for example OFDM modulation for a transmission rate of 54 Mb/s), etc.

A step E31 is a step of defining the transmission characteristics of a bit at 0, in particular the transmission channel used, either the same as the channel transmitting a bit at 1, or according to the other transmission channel selected at step E2 (or E11), the transmission power (for example −50 dBm), the modulation type (for example OFDM modulation for a transmission rate of 54 Mb/s), etc.

A step E32 is a step of defining the characteristics of the sequence of bits of the test signal, in particular the number of bits (for example 8), the duration of a bit (for example 10 ms).

A step E33 is a step of defining each of the bits in the sequence of the test signal, for example 10010110.

A step E34 is a step of defining the reception channel or channels of the receiver 130 of the receiving radio-communication device 13 so that its or their centre frequencies are in the frequency band of the transmission channel or channels of the transmitter 120 of the transmitting radio-communication device 12.

In a particular embodiment, the centre frequency of the or each reception channel corresponds to the centre frequency of the or each corresponding transmission channel.

In another particular embodiment, the centre frequency of the or each reception channel is, in the frequency band of the or each transmission channel, offset laterally with respect to the centre frequency of the or each corresponding transmission channel.

For example, the frequency band of a Wi-Fi channel, because it uses an OFDM modulation, has a width of 20 MHz corresponding to several Bluetooth channels with a width of 1 MHz. Step E34 can position the Bluetooth reception channel on one of these 20 channels of 1 MHz included in the spectrum occupied by the Wi-Fi signal. Thus it is possible to verify that the transmitting interface transmits a test channel having an expected spectral extent, in this case 20 MHz, for each channel.

A step E4 is a step of the transmission, by the transmitter 120 of the transmitting radio-communication device 12, in accordance with the configuration established at step E3, of each of the bits of the test signal and of detection, for each of them, of the test signal in a reception channel of the receiving radio-communication device 13 corresponding to the transmission channel of the transmitter 120 of the transmitting radio-communication device 12. The detection is for example done by measuring the radio-field level at the input of the receiver 131 of the receiving radio-communication device 13, in this case of the Bluetooth type. A loop on the bits of the code of the test signal includes a step E5 of selection of the first bit, a step E6 of checking that all the bits have been transmitted and detected and a step E7 of selection of a new bit.

Figure 6:
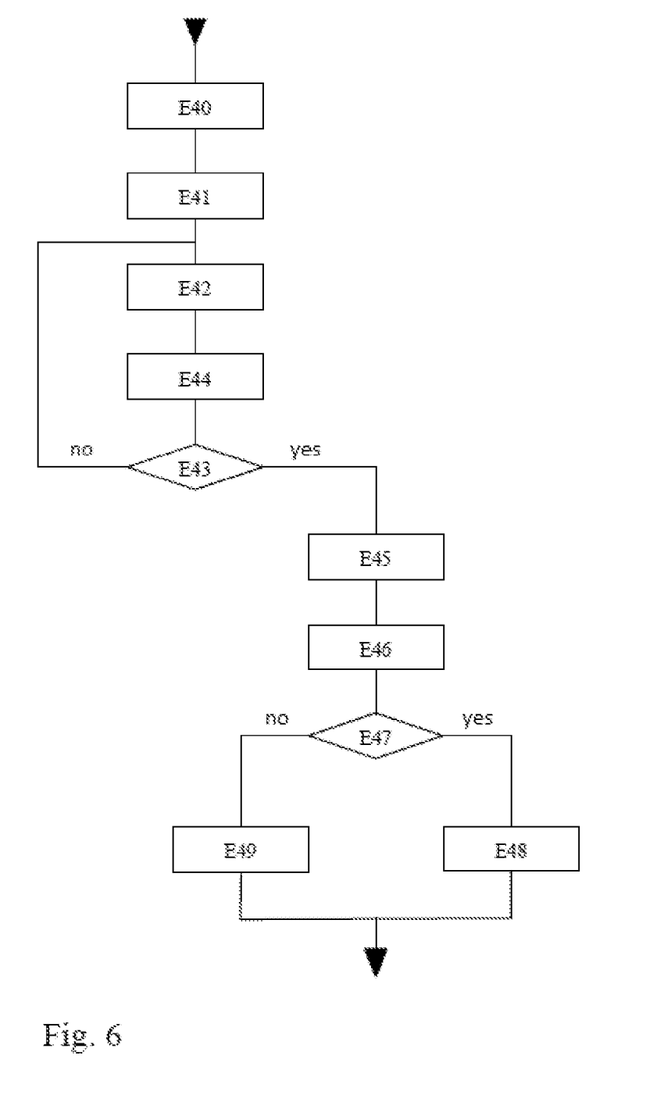
FIG. 6 is a diagram illustrating the steps that are implemented by a transmission and detection step for implementing a test method according to the present invention.

FIG. 6 illustrates the steps that are then implemented by step E4. A step E40 is a step of positioning of the transmitter 120 of the transmitting radio-communication device 12 so that it can transmit the relevant bit in accordance with the previously defined configuration, and of positioning of the receiver 131 of the radio-communication device 13 in accordance with the previously defined configuration so that it can detect this bit.

A step E41 is a step of transmission of the relevant bit by the transmitter 120 of the radio-communication device 12.

A step E42 is, in general terms, a step of detection of said relevant bit in accordance with step E200 described previously in relation to FIG. 2. In the particular embodiment described here, the detection step E42 consists of the receiving radio-communication device 13 measuring the radio-field level at its input following the transmission of the bit by the transmitter 120 of the transmitting radio-communication device 12. This detection step 42 may advantageously be repeated a plurality of times, on each occasion adding the measurement made, as long as a step E43 has not noted the expiry of the duration of the bit. At the end of each reading, a step E44 increments a counter from 0.

A step E45 demands the stoppage of the transmission of the relevant bit when the duration of this bit has expired.

A step E46 determines the received electrical field level as being the received mean electrical field level of the measurements made at step E42. This mean level corresponds to the total level divided by the number of measurements made given by the counter of step E44.

A step E47 is a step of verification that the previously received radio-field level determined corresponds to an expected radio field level. If such is the case, a step E49 validates the bit in question and positions a flag at 1 and, a step E50 does not validate it and positions the flag at 0. This flag is used subsequently, as explained below.

In the example mentioned above, a bit of the word of the test signal having a logic 1 level will be transmitted by the Wi-Fi transmitting radio-communication device 12 in the form of a continuous transmission for the duration of the measurement of a 54 Mbps OFDM modulated burst, in this case 10 ms, with a transmission level at the output of the transmitter of 0 dBm. At the time of a previous calibration measurement made under the same conditions at the time of design or manufacture of the equipment concerned, as described above, the radio-field level received by the receiver 131 of the radio-communication device 13 of the Bluetooth type positioned on a channel having the same centre frequency was determined as being normally +33 dBm±5 dBm. This level corresponds to the expected level. If, simultaneously with the transmission by the Wi-Fi transmitter 120 of a bit of the test signal having a logic 1 state, the Bluetooth receiving radio-communication device 13 positioned on the same centre frequency measures a received radio-field level above −38 dBm, step E47 considers that this level corresponds to the expected one and therefore validates this measurement by positioning the flag at 1. In the contrary case, it positions it at 0.

Likewise, a bit of the test signal having a logic 0 level will be transmitted by the Wi-Fi transmitter 120 in the form of a continuous transmission throughout the duration of the measurement of a 54 Mbps OFDM modulated burst with a transmission level at the output of the transmitter of less than −50 dBm. At the time of a prior calibration measurement made under the same conditions when the equipment was designed or manufactured it could be determined that the signal received by the Bluetooth receiver positioned on a channel having the same centre frequency should be less than −83 dBm.

If, simultaneously with the transmission by the Wi-Fi transmitter 120 of a bit of the test signal having a logic 0 state, the Bluetooth receiving radio-communication device 13 positioned on the same centre frequency measures a received power level of less than or equal to −38 dBm, step E47 considers that this level corresponds to the expected one and therefore validates this measurement by positioning the flag at 1. In the contrary case, it positions it at zero.

A step E8 is a step of checking that all the bits of the word of the test signal have been validated. To do this, step E8 uses the flag that was positioned at one of steps E48 and E49 for each of the bits of the code of the test signal.

If such is the case, this means that the complete connection between the transmitter 120 of the first radio-communication device, here of the Wi-Fi type, and the receiver 131 of the second radio-communication device, here of the Bluetooth type, is functional (case A).

If such is not the case, a step E9 checks whether the received radio-field level given by the RSSI signal corresponds to a presence level of a radio field measurable at the input of the receiver 131 of the receiving radio-communication device 13, here of the Bluetooth type.

If such is not the case, it is probable that the receiver 131 of the receiving radio-communication device 13 can be considered to be faulty (case B). This hypothesis may be reinforced if, during the prior mapping operation, the RSSI signal has not shown any measurable radio-field signal for any channel. This is because, in a normal residential environment, it is improbable that a total absence of signal in the ISM band will be encountered.

If the received power level given by the RSSI signal corresponds to a presence level of a measurable radio field at the input of the receiver 131 of the receiving radio-communication device 13, it is possible that not all the bits of the word of the test signal have been able to be validated because of a disturbing signal that has falsified the measurement. Thus at least one other test may be implemented by changing the characteristics of the test signal. To do this, a step E10 checks that the number of tests made is greater than a certain number and, if such is the case, it is probable that the transmitter 120 of the transmitting radio-communication device is damaged (case C). In the contrary case, a step E11 initiates a new test, for example by changing the transmission channel or channels of the transmitter 120 of the transmitting radio-communication device 12, either arbitrarily or by choosing the following transmission channel or channels in the order of the list of channels established at step E2.

In FIG. 1, the controller 11 of the equipment 10 comprises a processor 110 connected to a memory 111 in which there are stored firstly programs and secondly data useful to the execution of these programs by the processor 110. Among these, a computer program loaded in the memory 111 comprises instructions for the implementation, by the processor 110 of the processing unit 11, of the steps of a test method as just described, in a particular embodiment.

This computer program can be loaded into the memory 111 from external storage means 40, such as a card or memory key, a CD or DVD disc, etc., and by means of a suitable interface 17. These storage means 40 thus store this computer program, which comprises instructions for the implementation, when it is loaded into a memory 111 of a controller 11 of an item of equipment 10 as depicted in FIG. 1 and executed by a processor 110 of said controller 11, of a test method as just described, in a particular embodiment.

This computer program could also be loaded from a server (not shown) accessible via the internet 30.

The invention claimed is:

1. A method for testing a communication device comprising a controller and at least two radio-communication devices disposed in the communication device and coupled to the controller, each of said at least two radio-communication devices including a transmitter and a receiver, wherein a first radio-communication device of the at least two radio-communication devices uses a first communication protocol and a second radio-communication device of the at least two radio-communication devices uses a second communication protocol different from the first communication protocol and said at least two radio-communication devices share the same frequency band, the method comprising:

transmitting, by a transmitter to be tested of the first radio-communication device of the at least two radio-communication devices and configured to use the first communication protocol, a test signal in a transmission channel of the first radio-communication device of the at least two radio-communication devices, wherein the test signal is signed in the form of a sequence of predetermined time and/or frequency bits and/or transmitted power levels that the receiver can distinguish from transmission schemes that surrounding transmitters are likely to use, and detecting, by the receiver to be tested of the second radio-communication device and configured to use the second communication protocol, the test signal in a reception channel of the second radio-communication device of the at least two radio-communication devices, wherein a frequency range of the transmission channel overlaps with a frequency range of the reception channel, and wherein the detecting includes noting triggering, by said receiver of the second radio-communication device, of an event caused by presence of said test signal in the reception channel, the event including a channel in operation of the second radio-communication device or presence of an error message.

2. The test method according to claim 1, wherein the event including the change in the operation of the second radio-communication device and noting the triggering of the event includes detecting a change in a working channel used by the second radio-communication device from the reception channel to another channel of the second radio-communication device after the transmission of the test signal.

3. The test method according to claim 1, wherein the detecting comprises:

measuring a radio-field level in the reception channel for an interval of time corresponding to an interval of time that the test signal is transmitted in the transmission channel, and comparing the radio-field level with a predetermined target level.

4. The test method according to claim 1, further comprising selecting at a plurality of transmission channels for the first radio-communication device of the at least two radio-communication devices, configuring the first radio-communication device of the at least two radio-communication devices to transmit said test signal in the transmission channels selected and configuring the second radio-communication device of the at least two radio-communication devices to detect said test signal in a plurality of reception channels corresponding to the transmission channels selected.

5. The test method according to claim 4, wherein the selecting includes arbitrarily choosing said transmission channels.

6. The test method according to claim 4 wherein the selecting includes choosing, from all transmission channels supported by the first radio-communication device, the most calm transmission channel or channels.

7. The test method according to claim 1, wherein the test signal is signed in the form of the sequence of predetermined time bits and/or the sequence of predetermined frequency bits, and the detecting is performed for each bit in said sequence of said test signal, said method comprising verifying validity of each bit and verifying validity of all bits of the test signal.

8. The test method according to claim 7, further comprising verifying presence of a measurable radio field at an input of said receiver.

9. The test method according to claim 1, wherein the test signal is signed according to a deterministic scheme known to the second radio-communication device.

10. The test method according to claim 1, wherein the test signal is signed in the form of the sequence of predetermined time bits and said method further comprising:

determining validity of all bits of the test signal detected by the receiver to be tested of the second radio-communication device; and upon all the bits of the test signal not being validated, (1) changing characteristics of the test signal to provide a second test signal, (2) transmitting, by the transmitter to be tested of the first radio-communication device, the second test signal in the transmission channel of the first radio-communication device, and (3) detecting, by the receiver to be tested of the second radio-communication device, the second test signal in the reception channel of the second radio-communication device.

11. The test method according to claim 1, wherein the event includes presence of the error message and the error message includes a stuck beacon message.

12. The test method according to claim 1, wherein the event includes the change in the operation of the second radio-communication device and the change in the operation includes detecting introduction of a new channel while the test signal is transmitted by the transmitter to be tested of the first radio-communication device.

13. A non-transitory computer readable memory comprising instructions that, when executed by a communication device comprising a controller and at least two radio-communication devices disposed in the communication device and coupled to the controller, each of said at least two radio-communication devices including a transmitter and a receiver, wherein a first radio-communication device of the at least two radio-communication devices uses a first communication protocol and a second radio-communication device of the at least two radio-communication devices uses a second communication protocol different from the first communication protocol and said at least two radio-communication devices share the same frequency band, cause the communication device to:

transmit, by a transmitter to be tested of the first radio-communication device of the at least two radio-communication devices and configured to use the first communication protocol, a test signal in a transmission channel of the first radio-communication device of the at least two radio-communication devices, wherein the test signal is signed in the form of a sequence of predetermined time and/or frequency bits and/or transmitted power levels that the receiver can distinguish from transmission schemes that surrounding transmitters are likely to use, and detect, by the receiver to be tested of the second radio-communication device and configured to use the second communication protocol, the test signal in a reception channel of the second radio-communication device of a second of the at least two radio-communication devices, wherein a frequency range of the transmission channel overlaps with a frequency range of the reception channel, and wherein the detecting includes noting triggering, by said receiver of the second radio-communication device, of an event caused by presence of said test signal in the reception channel, the event including a change in operation of the second radio-communication device or presence of an error message.

14. A communication device comprising:

a controller including circuitry; and at least two radio-communication devices disposed in the communication device and coupled to the controller, each of said at least two radio-communication devices including a transmitter and a receiver, wherein a first radio-communication device of the at least two radio-communication devices uses a first communication protocol and a second radio-communication device of the at least two radio-communication devices uses a second communication protocol different from the first communication protocol and said at least two radio-communication devices share the same frequency band, wherein the controller is adapted for:

transmitting, by a transmitter to be tested of the first radio-communication device of the at least two radio-communication devices and configured to use the first communication protocol, a test signal in a transmission channel of the first radio-communication device of the at least two radio-communication devices, wherein the test signal is signed in the form of a sequence of predetermined time and/or frequency bits and/or transmitted power levels that the receiver can distinguish from transmission schemes that surrounding transmitters are likely to use, and detecting, by the receiver to be tested of the second radio-communication device and configured to use the second communication protocol, the test signal in a reception channel of the second radio-communication device of the at least two radio-communication devices, wherein a frequency range of the transmission channel overlaps with a frequency range of the reception channel, and wherein the detecting includes noting triggering, by said receiver of the second radio-communication device, of an event caused by presence of said test signal in the reception channel, the event including a change in operation of the second radio-communication device or presence of an error message.

* * * * *